(12) United States Patent
Kikuchi et al.

(10) Patent No.: US 8,027,151 B2
(45) Date of Patent: Sep. 27, 2011

(54) SOLID ELECTROLYTIC CAPACITOR

(75) Inventors: Kazuhito Kikuchi, Hirakata (JP);
Kazuhiro Takatani, Amagasaki (JP);
Mutsumi Yano, Hirakata (JP); Takashi Umemoto, Hirakata (JP); Hiroshi Nonoue, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 316 days.

(21) Appl. No.: 12/272,961

(22) Filed: Nov. 18, 2008

(65) Prior Publication Data

US 2009/0128997 A1 May 21, 2009

(30) Foreign Application Priority Data

Nov. 21, 2007 (JP) .................................. 2007-301378

(51) Int. Cl.
*H01G 9/02* (2006.01)
*H01G 9/04* (2006.01)

(52) U.S. Cl. .......................... 361/525; 361/528; 29/25.03

(58) Field of Classification Search .................. 361/523, 361/524, 525–527; 29/25.03
See application file for complete search history.

(56) References Cited

U.S. PATENT DOCUMENTS

| 6,306,509 B2 * | 10/2001 | Takeuchi et al. | 428/425.8 |
| 2005/0030678 A1 * | 2/2005 | Taketani et al. | 361/15 |
| 2005/0219801 A1 * | 10/2005 | Yano et al. | 361/523 |

FOREIGN PATENT DOCUMENTS

| JP | 02-235321 A | | 9/1990 |
| JP | 02235321 A | * | 9/1990 |
| JP | 10-321471 A | | 12/1998 |

* cited by examiner

*Primary Examiner* — Eric Thomas
(74) *Attorney, Agent, or Firm* — Marvin A. Motsenbocker; Mots Law, PLLC

(57) ABSTRACT

An aspect of the invention provides a solid electrolytic capacitor that comprises: an anode formed of a valve metal or an alloy mainly made of a valve metal; a dielectric layer formed on a surface of the anode; a first conducting polymer layer formed on the dielectric layer, the first conducting polymer layer containing a non-ionic surfactant; a second conducting polymer layer formed on the first conducting polymer layer; and a cathode layer formed on the second conducting polymer layer.

18 Claims, 1 Drawing Sheet

SOLID ELECTROLYTIC CAPACITOR

CROSS REFERENCE TO RELATED APPLICATIONS

This application claims priority based on 35 USC 119 from prior Japanese Patent Application No. P2007-301378 filed on Nov. 21, 2007, entitled "Solid Electrolytic Capacitor", the entire contents of which are incorporated herein by reference.

BACKGROUND OF THE INVENTION

1. Field of the Invention

The present invention relates to a solid electrolytic capacitor and a method for manufacturing the same.

2. Description of Related Art

A solid electrolytic capacitor is generally configured by: anodizing an anode made of a valve metal, such as tantalum or niobium, thereby forming a dielectric layer mainly made of an oxide on a surface of the anode; forming an electrolyte layer on the dielectric layer; and then forming a cathode layer on the dielectric layer. In such a solid electrolytic capacitor, it is preferable that its equivalent series resistance (ESR) be small.

As a method for decreasing ESR, proposed is a formation of an electrolyte layer made of a conducting polymer. Specifically, Japanese Patent Application Publication No. Hei 10-321471 proposes formations of: a first conducting polymer layer made of polythiophene or a derivative thereof; and a second conducting polymer layer made of polypyrrole or a derivative thereof on the first conducting polymer layer.

However, the solid electrolytic capacitor with the conducting-polymer electrolyte layer formed therein has a problem that, when the solid electrolytic capacitor is preserved under a high-temperature condition, adhesiveness between the dielectric layer and the electrolyte layer decreases, thus causing a decrease of capacitance.

Accordingly, an object of the present invention is to provide a solid electrolytic capacitor with excellent preservation characteristics under a high-temperature condition and a method for manufacturing the solid electrolytic capacitor.

SUMMARY OF THE INVENTION

An aspect of the invention provides a solid electrolytic capacitor that comprises: an anode formed of any one of a valve metal and an alloy mainly made of a valve metal; a dielectric layer formed on a surface of the anode; a first conducting polymer layer formed on the dielectric layer, the first conducting polymer layer containing a non-ionic surfactant; a second conducting polymer layer formed on the first conducting polymer layer; and a cathode layer formed on the second conducting polymer layer.

Since the first conducting polymer layer contains the non-ionic surfactant, adhesiveness between the dielectric layer and the first conducting polymer layer is improved. Accordingly, a decrease of capacitance under a high-temperature preserving condition can be checked. Thus, a solid electrolytic capacitor with excellent preservation characteristics under a high-temperature condition can be obtained.

It is preferable that the non-ionic surfactant be contained only in the first conducting polymer layer. Accordingly, it is preferable that the non-ionic surfactant be not contained in the second conducting polymer layer. The second conducting polymer layer is prevented from containing the ionic-surfactant, so that adhesiveness between the first and second conducting polymer layers can be increased. Furthermore, the decrease of capacitance can be checked. Thus, the preservation characteristics can be further improved.

Here, examples of the non-ionic surfactant are polyethylene glycol, polyglycerol, polyethylene glycol alkyl ether, polyethylene glycol fatty acid ester, polyethylene glycol alkyl thioether, polyethylene glycol alkyl phenol ether and polyethylene glycol alkyl amide. Above all, polyethylene glycol and polyglycerol are preferably used. It is preferable that the molecular weight of polyethylene glycol be at least 400 but less than 1400. In addition, it is preferable that, in the non-ionic surfactant having a polyethylene glycol chain, the molecular weight of the polyethylene glycol chain portion be at least 400 but less than 1400.

It is preferable that the molecular weight of polyglycerol be at least 300 but less than 4000. By setting the molecular weight within the above-described range, the decrease of capacitance can be more effectively checked.

It is preferable that the content of the non-ionic surfactant in the first conducting polymer layer be from 0.0005 weight % to 0.005 weight %. By setting the content to such range, adhesiveness between the dielectric layer and the first conducting polymer layer can be increased. Accordingly, the decrease of capacitance can be more effectively checked.

It is preferable that the first and second conducting polymer layers be each formed of at least one kind selected from poly(3,4-ethylenedioxythiophene) and polypyrrole. Furthermore, it is preferable that the first conducting polymer layer be formed of poly(3,4-ethylenedioxythiophene) and the second conducting polymer layer be formed of polypyrrole.

Fluorine can be contained in the dielectric layer by anodization carried out in an electrolyte solution containing fluorine ions as described later.

Another aspect of the invention provides a method for manufacturing a solid electrolytic capacitor that comprises the steps of: forming an anode from any one of a valve metal and an alloy mainly made of a valve metal; forming a dielectric layer by anodizing the anode; forming a first conducting polymer layer on a surface of the dielectric layer by applying a solution containing a monomer and a non-ionic surfactant to the surface and by then polymerizing the monomer, the first conducting polymer layer containing the non-ionic surfactant; forming a second conducting polymer layer on the first conducting polymer layer by polymerizing a monomer for forming the second conducting polymer layer; and forming a cathode layer on the second conducting polymer layer.

According to the above-described method, the solid electrolytic capacitor can be efficiently manufactured. Thus, according to the above-described method, the solid electrolytic capacitor with excellent preservation characteristics under a high-temperature condition can be efficiently manufactured.

The valve metal for forming the anode is not limited as long as the valve metal can be used for solid electrolytic capacitors. Examples of the valve metal are tantalum, niobium, titanium, aluminum, hafnium, and zirconium. Above all, tantalum, niobium, and titanium, whose oxide has a high permittivity, are particularly preferable.

In addition, an example of the alloy which is mainly made of a valve metal is an alloy of at least two kinds of valve metals, such as tantalum and niobium.

In the above-described method, the dielectric layer is formed by anodizing the anode. It is preferable that the dielectric layer contain fluorine as described above. Fluorine can be contained in the dielectric layer by carrying out the anodization in an electrolyte solution containing fluorine ions. An example of such electrolyte solution is an electrolyte solution containing at least one kind selected from the group consisting of ammonium fluoride, potassium fluoride, sodium fluoride, and hydrofluoric acid. This dielectric layer containing fluorine increases a surface area thereof because, in the formation, one portion of the anode surface is etched by the fluorine ions contained in the electrolyte solution. For this reason, adhesiveness between the first electrolyte layer and the dielectric layer can be increased. Accordingly, the decrease of capacitance can be further checked.

In the above-described method, it is preferable that the first conducting polymer layer be formed by a chemical polymerization method. In addition, it is preferable that the second conducting polymer layer be formed by an electrolytic polymerization method. Here, the cathode layer is formed on the second conducting polymer layer. The cathode layer is not particularly limited as long as it can be used for solid electrolytic capacitors. In general, the cathode layer is formed by stacking a carbon layer and a silver paste layer. The carbon layer can be formed by, for example, applying a carbon paste to the second conducting polymer layer and then drying the carbon paste. The silver paste layer can be formed by applying a silver paste to the carbon layer and then drying the silver paste.

DETAILED DESCRIPTION OF EMBODIMENTS

Figure 1:
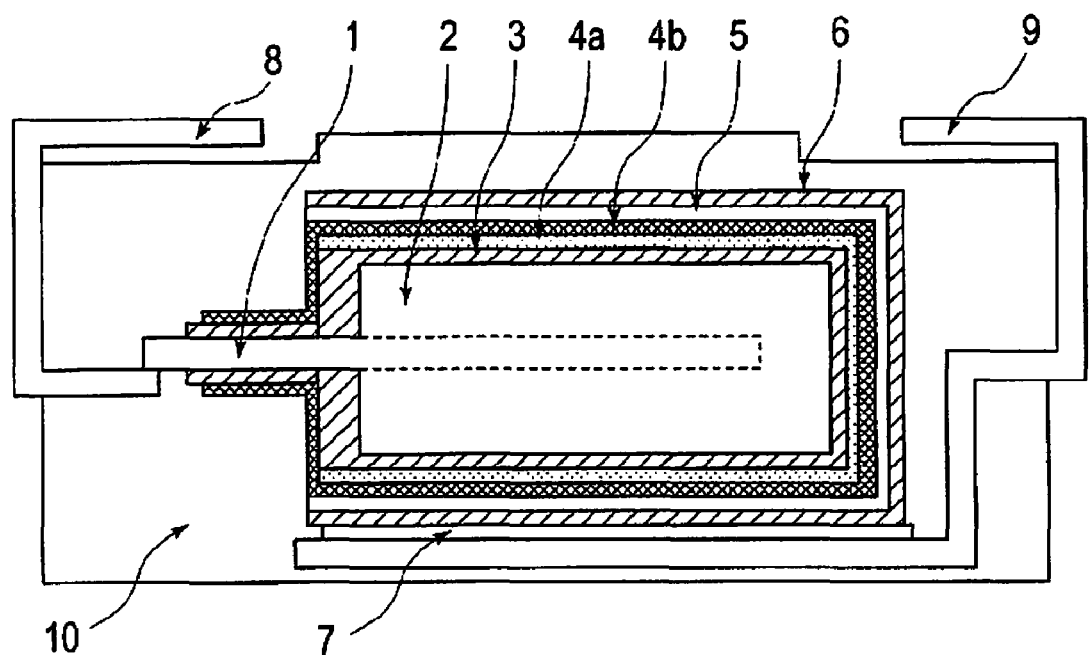
FIG. 1 is a schematic cross-sectional view showing an embodiment of a solid electrolytic capacitor.

A solid electrolytic capacitor according to one embodiment of the present invention will be described in more detail. However, the present invention is not limited to the following embodiments and can be appropriately changed without departing from spirit and scope of the invention.

Prepositions, such as "on", "over" and "above" may be defined with respect to a surface, for example a layer surface, regardless of that surface's orientation in space. The preposition "above" may be used in the specification and claims even if a layer is in contact with another layer. The preposition "on" may be used in the specification and claims when a layer is not in contact with another layer, for example, when there is an intervening layer between them.

FIG. 1 is a schematic cross-sectional view showing a solid electrolytic capacitor of one embodiment. As shown in FIG. 1, anode lead 1 is buried in anode 2. Anode 2 is prepared by molding and sintering a valve metal powder. Dielectric layer 3 is formed on a surface of anode 2. Dielectric layer 3 is also formed on a surface in an inner portion of anode 2, which is a porous body. First conducting polymer layer 4a is formed on dielectric layer 3. In addition, second conducting polymer layer 4b is formed on first conducting polymer layer 4a. Similar to dielectric layer 3, first and second conducting polymer layers 4a and 4b are also formed in the inner portion of anode 2. First and second conducting polymer layers 4a and 4b form an electrolyte layer.

Carbon layer 5 is formed on second conducting polymer layer 4b on the outer circumferential surface of anode 2, and silver paste layer 6 is formed thereon. A cathode layer includes carbon layer 5 and silver paste layer 6. Silver paste layer 6 is connected to cathode terminal 9 via conductive adhesive 7. In addition, anode lead 1 is connected to anode terminal 8. Mold outer package resin 10 is formed such that end portions of anode terminal 8 and cathode terminal 9, respectively, can extend to the outside.

In the present embodiment, first conducting polymer layer 4a contains a non-ionic surfactant. Due to the non-ionic surfactant contained in first conducting polymer layer 4a, adhesiveness between dielectric layer 3 and first conducting polymer layer 4a can be increased, and preservation characteristics under a high-temperature condition can be improved.

Experiment 1

EXAMPLE 1

Step 1:
By sintering tantalum powder with a mean particle diameter of approximately 2 μm at a temperature of approximately 1400° C., an anode is prepared from a porous sintered compact in which a tantalum metal lead is buried. This anode is dipped in 0.1 weight % of an ammonium fluoride solution, which is kept at 40° C. The anode is anodized at a constant voltage of 10 V for 10 hours, so that a dielectric layer made of tantalum oxide is formed on the surface of the anode.

Step 2:
Next, the anode prepared at Step 1 is dipped in a 3,4-ethylenedioxythiophene solution containing approximately 0.001 weight % of polyethylene glycol (PEG: mean molecular weight is 1000) in relation to a monomer for 10 minutes. The 3,4-ethylenedioxythiophene solution thus used is a solution containing 2 mol/liter of 3,4-ethylenedioxythiophene. Thereafter, the anode is dipped in a solution containing 0.5 mol/liter of ammonium persulfate as an oxidizer for 10 minutes, and 3,4-ethylenedioxythiophene is polymerized by a chemical polymerization method. Thereby, a first conducting polymer layer made of poly(3,4-ethylenedioxythiophene) is formed.

After that, the resultant anode is dipped in an acetonitrile solution containing 2 mol/liter of pyrrole and 0.1 mol/liter of naphthalenesulfonic acid. The pyrrole is polymerized by an electrolytic polymerization method in which 1 mA of current is applied for 5 hours. Thereby, a second conducting polymer layer made of polypyrrole is formed.

Step 3:
Next, the carbon paste and the silver paste are applied in this order and then dried. Thereby, a carbon layer and a silver paste layer are formed. A cathode terminal is connected to the silver paste layer via a conductive adhesive, and an anode terminal is connected to the metal lead. The resulting anode is then covered with a mold resin. Thus, solid electrolytic capacitor A1 is manufactured.

It is confirmed by infrared absorption measurement using a reflection method with a Fourier transformation-type infrared (FT-IR) spectrophotometer that the first conducting polymer layer contains polyethylene glycol. Polyethylene glycol is contained in the 3,4-ethylenedioxythiophene solution for forming the first conducting polymer layer so that polyethylene glycol may be approximately 0.001 weight % in relation to 3,4-ethylenedioxythiophene which is a monomer. It is also confirmed that approximately 0.001 weight % of polyethylene glycol is contained in the first conducting polymer layer formed from the solution as well. Accordingly, it is confirmed that the first conducting polymer layer contains a comparable content of polyethylene glycol to the content of the monomer which is contained in the monomer solution.

In addition, it is confirmed by X-ray photoelectron spectroscopy (XPS) that the dielectric layer contains fluorine.

EXAMPLE 2

Solid electrolytic capacitor A2 is manufactured in a similar manner to Example 1, excepting that a solution containing approximately 0.001 weight % of polyglycerol (PG: mean molecular weight is 1000) in relation to a monomer is used for forming a first conducting polymer layer in place of the solution containing polyethylene glycol.

Similar to the foregoing manner, it is confirmed that the first conducting polymer layer contains polyglycerol and a dielectric layer contains fluorine.

EXAMPLE 3

Solid electrolytic capacitor A3 is manufactured in a similar manner to Example 1, excepting that a solution containing approximately 0.001 weight % of polyvinyl alcohol (PVA: mean molecular weight is 1000) in relation to a monomer is used for forming a first conducting polymer layer in place of the solution containing polyethylene glycol.

Similar to the foregoing manner, it is confirmed that the first conducting polymer layer contains polyvinyl alcohol and a dielectric layer contains fluorine.

EXAMPLE 4

Solid electrolytic capacitor A4 is manufactured in a similar manner to Example 1, excepting that a solution containing approximately 0.001 weight % of polyethylene glycol monooleyl ether (PEGMOE: mean molecular weight is 1000) in relation to a monomer is used for forming a first conducting polymer layer in place of the solution containing polyethylene glycol.

Similar to the foregoing manner, it is confirmed that the first conducting polymer layer contains polyethylene glycol monooleyl ether and a dielectric layer contains fluorine.

EXAMPLE 5

Solid electrolytic capacitor A5 is manufactured in a similar manner to Example 1, excepting that a solution containing approximately 0.001 weight % of polyethylene glycol monolauryl ether (PEGMLE: mean molecular weight is 1000) in relation to a monomer is used for forming a first conducting polymer layer in place of the solution containing polyethylene glycol.

Similar to the foregoing manner, it is confirmed that the first conducting polymer layer contains polyethylene glycol monolauryl ether and a dielectric layer contains fluorine.

EXAMPLE 6

Solid electrolytic capacitor A6 is manufactured in a similar manner to Example 1, excepting that a solution containing approximately 0.001 weight % of polyethylene glycol monostearate (PEGMS: mean molecular weight is 1000) in relation to a monomer is used for forming a first conducting polymer layer in place of the solution containing polyethylene glycol.

Similar to the foregoing manner, it is confirmed that the first conducting polymer layer contains polyethylene glycol monostearate and a dielectric layer contains fluorine.

EXAMPLE 7

Solid electrolytic capacitor A7 is manufactured in a similar manner to Example 1, excepting that a pyrrole solution containing polyethylene glycol is used for forming a first conducting polymer layer in place of the 3,4-ethylenedioxythiophene solution containing polyethylene glycol.

Similar to the foregoing manner, it is confirmed that the first conducting polymer layer contains polyethylene glycol and a dielectric layer contains fluorine.

EXAMPLE 8

Solid electrolytic capacitor A8 is manufactured in a similar manner to Example 1, excepting that a solution containing 3,4-ethylenedioxythiophene is used as a solution for forming a second conducting polymer layer in place of the solution containing pyrrole.

Note that, an acetonitrile solution containing 2 mol/liter of 3,4-ethylenedioxythiophene and 0.1 mol/liter of naphthalenesulfonic acid is used as the 3,4-ethylenedioxythiophene solution for forming the second conducting polymer layer.

Similar to the foregoing manner, it is confirmed that the first conducting polymer layer contains polyethylene glycol and a dielectric layer contained fluorine.

EXAMPLE 9

Solid electrolytic capacitor A9 is manufactured in a similar manner to Example 8, excepting that a first conducting polymer layer is formed of polypyrrole in a similar manner to Example 7.

Similar to the foregoing manner, it is confirmed that the first conducting polymer layer contains polyethylene glycol and a dielectric layer contains fluorine.

EXAMPLE 10

Solid electrolytic capacitor A10 is manufactured in a similar manner to Example 1, excepting that a 3,4-ethylenedioxythiophene solution containing approximately 0.0005 weight % of polyethylene glycol (mean molecular weight is 1000) in relation to a monomer and approximately 0.0005 weight % of polyglycerol (mean molecular weight is 1000) in relation to a monomer is used as a solution for forming a first conducting polymer layer.

Similar to the foregoing manner, it is confirmed that the first conducting polymer layer contains polyethylene glycol and polyglycerol and a dielectric layer contains fluorine.

EXAMPLE 11

Solid electrolytic capacitor A11 is manufactured in a similar manner to Example 1, excepting that a solution in which a solution containing 2 mol/liter of pyrrole, 0.1 mol/liter of naphthalenesulfonic acid and approximately 0.001 weight % of polyethylene glycol (mean molecular weight is 1000) in relation to a monomer is contained in an acetonitrile solution as a solution for forming a second conducting polymer layer.

Similar to the foregoing manner, it is confirmed that a first conducting polymer layer and the second conducting polymer layer contain polyethylene glycol and a dielectric layer contains fluorine.

EXAMPLE 12

A second conducting polymer layer is formed as follows. Firstly, an anode provided with a first conducting polymer layer formed in a similar manner to Example 1 is dipped in a solution containing 2 mol/liter of pyrrole for 10 minutes; then, the resultant anode is dipped in a solution containing 0.5 mol/liter of ammonium persulfate as an oxidizer for 10 minutes; and chemical polymerization is conducted to form the second conducting polymer layer. Thereafter, in a similar manner to Example 1, solid electrolytic capacitor A12 is manufactured.

Similar to the foregoing manner, it is confirmed that the first conducting polymer layer contains polyethylene glycol and a dielectric layer contains fluorine.

Comparative Example 1

Solid electrolytic capacitor X is manufactured in a similar manner to Example 1, excepting that a first conducting polymer layer is formed in the following manner.

An anode provided with a dielectric layer is dipped in a solution formed of:

5 weight % of 3,4-ethylenedioxythiophene;
25 weight % of p-toluenesulfonic acid;
30 weight % of n-butanol;
37 weight % of i-propanol; and
3 weight % of pure water.

Thereafter, polymerization is conducted at 50° C. for 10 minutes. After an unreacted monomer and excessive acid are rinsed, the anode is dried at 100° C. for 5 minutes. After this process is repeated 5 times, a first conducting polymer layer made of poly(3,4-ethylenedioxythiophene is formed.

Comparative Example 2

Solid electrolytic capacitor Y is manufactured in a similar manner to Example 1, excepting that a second conducting polymer layer is not formed.

Comparative Example 3

Solid electrolytic capacitor Z is manufactured in a similar manner to Example 11, excepting that polyethylene glycol is not contained in a first conducting polymer layer since a 3,4-ethylenedioxythiophene solution without polyethylene glycol is used in forming the first conducting polymer layer.

[Long-Term Reliability Experiment]

Preserving experiments are carried out at 105° C. for 1000 hours for solid electrolytic capacitors A1 to A12 and X to Z of the above-described examples and comparative examples. Setting an initial value of capacitance to be 100%, a maintenance factor of capacitance is calculated as follows. The capacitance is measured at the frequency of 120 Hz by an LCR meter.

Maintenance factor of capacitance (%)=(capacitance after preserving experiment/capacitance before preserving experiment)×100

The maintenance factors of capacitances measured as described above are shown in Table 1.

TABLE 1

| | First Conducting Polymer Layer | Second Conducting Polymer Layer | Maintenance Factor of Capacitance (%) |
|---|---|---|---|
| Solid electrolytic capacitor A1 | poly(3,4-ethylenedioxythiophene) PEG | polypyrrole | 95 |
| Solid electrolytic capacitor A2 | poly(3,4-ethylenedioxythiophene) PG | polypyrrole | 96 |
| Solid electrolytic capacitor A3 | poly(3,4-ethylenedioxythiophene) PVA | polypyrrole | 80 |
| Solid electrolytic capacitor A4 | poly(3,4-ethylenedioxythiophene) PEGMOE | polypyrrole | 78 |
| Solid electrolytic capacitor A5 | poly(3,4-ethylenedioxythiophene) PEGMLE | polypyrrole | 79 |
| Solid electrolytic capacitor A6 | poly(3,4-ethylenedioxythiophene) PEGMS | polypyrrole | 78 |
| Solid electrolytic capacitor A7 | polypyrrole PEG | polypyrrole | 94 |
| Solid electrolytic capacitor A8 | poly(3,4-ethylenedioxythiophene) PEG | poly(3,4-ethylenedioxythiophene) | 94 |
| Solid electrolytic capacitor A9 | polypyrrole PEG | poly(3,4-ethylenedioxythiophene) | 93 |
| Solid electrolytic capacitor A10 | poly(3,4-ethylenedioxythiophene) PEG + PG | polypyrrole | 94 |
| Solid electrolytic capacitor A11 | poly(3,4-ethylenedioxythiophene) PEG | polypyrrole PEG | 78 |
| Solid electrolytic capacitor A12 | poly(3,4-ethylenedioxythiophene) PEG | polypyrrole(chemical polymerization) | 72 |
| Solid electrolytic capacitor X | poly(3,4-ethylenedioxythiophene) | polypyrrole | 55 |

TABLE 1-continued

|  | First Conducting Polymer Layer | Second Conducting Polymer Layer | Maintenance Factor of Capacitance (%) |
|---|---|---|---|
| Solid electrolytic capacitor Y | poly(3,4-ethylenedioxythiophene) PEG | — | 57 |
| Solid electrolytic capacitor Z | poly(3,4-ethylenedioxythiophene) | polypyrrole PEG | 58 |

As is clear from the results shown in Table 1, solid electrolytic capacitors A1 to A12 in which a non-ionic surfactant is contained in the first conducting polymer layer according to the embodiment can have a higher maintenance factor of capacitance than that of solid electrolytic capacitors X to Z of the comparative examples. From this result, in the examples, the capacitance preservation with unpredictable results by those in the art can be obtained. Therefore, it can be seen that the solid electrolytic capacitors of the examples are excellent in preservation characteristics, that is, long-term reliability.

Although the second conducting polymer layer contains polyethylene glycol in solid electrolytic capacitor A11, the maintenance factor of capacitance of solid electrolytic capacitor A11 is low when compared with that of solid electrolytic capacitor A1 in which polyethylene glycol is not contained in the second conducting polymer layer. For this reason, it can be seen that the non-ionic surfactant is preferably contained only in the first conducting polymer layer.

In addition, it can be seen, from the results of solid electrolytic capacitors A1 to A6, that polyethylene glycol and polyglycerol are particularly preferable as the non-ionic surfactant.

Experiment 2

Here, studied is a relationship between the content of the non-ionic surfactant in a first conducting polymer layer and the maintenance factor of capacitance.

EXAMPLES 13 to 20

Solid electrolytic capacitors B1 to B8 are manufactured in a similar manner to Example 1, excepting that the content of polyethylene glycol (PEG) or polyglycerol (PG) in a first conducting polymer layer is changed as shown in Table 2. Note that, the content is adjusted by changing the content in a monomer solution for forming the first conducting polymer layer.

Maintenance factors of capacitances of solid electrolytic capacitors B1 to B8 are obtained as in the foregoing manner and are shown in table 2. Note that Table 2 also shows the values of solid electrolytic capacitors A1 and A2.

TABLE 2

|  | Additive in First Conducting Polymer Layer | Content (weight %) | Maintenance Factor of Capacitance (%) |
|---|---|---|---|
| Solid electrolytic capacitor B1 | PEG | approximately 0.0001 | 83 |
| Solid electrolytic capacitor B2 | PEG | approximately 0.0005 | 95 |
| Solid electrolytic capacitor A1 | PEG | approximately 0.001 | 95 |
| Solid electrolytic capacitor B3 | PEG | approximately 0.005 | 94 |
| Solid electrolytic capacitor B4 | PEG | approximately 0.01 | 87 |
| Solid electrolytic capacitor B5 | PG | approximately 0.0001 | 85 |
| Solid electrolytic capacitor B6 | PG | approximately 0.0005 | 95 |
| Solid electrolytic capacitor A2 | PG | approximately 0.001 | 96 |
| Solid electrolytic capacitor B7 | PG | approximately 0.005 | 94 |
| Solid electrolytic capacitor B8 | PG | approximately 0.01 | 88 |

As is clear from the results shown in Table 2, it can be seen that the content of the non-ionic surfactant in the first conducting polymer layer is preferred to be in a range from approximately 0.0005 weight % to 0.005 weight %.

Experiment 3

Here, studied is a relationship between the molecular weight of polyethylene glycol and the maintenance factor of capacitance.

EXAMPLES 21 to 29

Solid electrolytic capacitors C1 to C9 are manufactured in a similar manner to Example 1, excepting that the mean molecular weight of polyethylene glycol (PEG) contained in a first conducting polymer layer is changed as shown in Table 3. Then, the maintenance factors of capacitances of solid electrolytic capacitors C1 to C9 are measured. Table 3 shows measurement results. Note that, Table 3 also shows the value of solid electrolytic capacitor A1.

TABLE 3

| | Mean Molecular Weight Of Polyethylene Glycol | Maintenance Factor Of Capacitance (%) |
|---|---|---|
| Solid electrolytic capacitor C1 | 100 | 83 |
| Solid electrolytic capacitor C2 | 200 | 84 |
| Solid electrolytic capacitor C3 | 300 | 85 |
| Solid electrolytic capacitor C4 | 400 | 92 |
| Solid electrolytic capacitor C5 | 600 | 94 |
| Solid electrolytic capacitor C6 | 800 | 95 |
| Solid electrolytic capacitor A1 | 1000 | 95 |
| Solid electrolytic capacitor C7 | 1200 | 93 |
| Solid electrolytic capacitor C8 | 1400 | 85 |
| Solid electrolytic capacitor C9 | 1600 | 85 |

As is clear from the results shown in Table 3, it can be seen that the molecular weight of polyethylene glycol is preferred to be at least 400 but less than 1400, more preferably, at least 600 and at most 1200.

Experiment 4

Here, studied is a relationship between the molecular weight of polyglycerol and the maintenance factor of capacitance.

EXAMPLES 30 to 38

Solid electrolytic capacitors D1 to D9 are manufactured in a similar manner to Example 2, excepting that the mean molecular weight of polyglycerol (PG) contained in a first conducting polymer layer is changed as shown in Table 4. Then, the maintenance factors of capacitances of solid electrolytic capacitors D1 to D9 are measured. Table 4 shows measurement results. Note that, Table 4 also shows the value of solid electrolytic capacitor A2.

TABLE 4

| | Mean Molecular Weight Of Polyglycerol | Maintenance Factor Of Capacitance (%) |
|---|---|---|
| Solid electrolytic capacitor D1 | 150 | 82 |
| Solid electrolytic capacitor D2 | 200 | 84 |
| Solid electrolytic capacitor D3 | 300 | 92 |
| Solid electrolytic capacitor D4 | 800 | 94 |
| Solid electrolytic capacitor A2 | 1000 | 96 |
| Solid electrolytic capacitor D5 | 2000 | 95 |
| Solid electrolytic capacitor D6 | 3000 | 93 |
| Solid electrolytic capacitor D7 | 3500 | 92 |
| Solid electrolytic capacitor D8 | 4000 | 85 |

TABLE 4-continued

| | Mean Molecular Weight Of Polyglycerol | Maintenance Factor Of Capacitance (%) |
|---|---|---|
| Solid electrolytic capacitor D9 | 5000 | 83 |

As is clear from the results shown in Table 4, it can be seen that the molecular weight of polyglycerol is preferred to be at least 300 but less than 4000, more preferably, at least 800 and at most 3000.

Experiment 5

Here, studied is an effect of an electrolyte contained in an electrolyte solution used for anodization.

EXAMPLES 39 to 47

Solid electrolytic capacitors E2 to E10 are manufactured in a similar manner to Example 1, excepting that an anode is anodized by using an electrolyte solution containing an electrolyte shown in Table 5. Note that, the concentration of electrolyte in the electrolyte solution is set to be 0.1 weight %.

Measured maintenance factors of capacitances thereof are shown in Table 5. Note that, Table 5 also shows the value of solid electrolytic capacitor A1. In addition, it is confirmed by X-ray photoelectron spectroscopy (XPS) that a dielectric layer contains fluorine if the electrolytic solution containing potassium fluoride, sodium fluoride, or hydrofluoric acid is used.

TABLE 5

| | Electrolyte | Maintenance Factor Of Capacitance (%) |
|---|---|---|
| Solid electrolytic capacitor A1 | ammonium fluoride | 95 |
| Solid electrolytic capacitor E2 | potassium fluoride | 94 |
| Solid electrolytic capacitor E3 | sodium fluoride | 94 |
| Solid electrolytic capacitor E4 | hydrofluoric acid | 93 |
| Solid electrolytic capacitor E5 | phosphoric acid | 77 |
| Solid electrolytic capacitor E6 | sulfuric acid | 70 |
| Solid electrolytic capacitor E7 | hydrochloric acid | 71 |
| Solid electrolytic capacitor E8 | potassium hydroxide | 70 |
| Solid electrolytic capacitor E9 | sodium hydroxide | 70 |
| Solid electrolytic capacitor E10 | adipic acid | 71 |

As is clear from the results shown in Table 5, the maintenance factors of capacitances are considerably improved when the dielectric layer contains fluorine.

As has been described above, the solid electrolytic capacitor according to the present embodiment can increase adhesiveness between the dielectric layer and the first conducting polymer layer, and a decrease of capacitance can be checked. Accordingly, a solid electrolytic capacitor with excellent preservation characteristics under a high-temperature condition can be obtained.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A solid electrolytic capacitor comprising:
   an anode formed of any one of a valve metal and an alloy mainly made of a valve metal;
   a dielectric layer formed on a surface of the anode;
   a first conducting polymer layer formed on the dielectric layer, the first conducting polymer layer containing a non-ionic surfactant;
   a second conducting polymer layer formed on the first conducting polymer layer and lacking the non-ionic surfactant; and
   a cathode layer formed on the second conducting polymer layer.

2. The capacitor of claim 1, wherein the first and second conducting polymer layers are each formed of at least one of poly(3,4-ethylenedioxythiophene) and polypyrrole.

3. The capacitor of claim 1, wherein the non-ionic surfactant in the first conducting polymer layer is within 0.0005 weight % to 0.005 weight %.

4. The capacitor of claim 1, wherein the non-ionic surfactant is at least one of polyethylene glycol and polyglycerol.

5. The capacitor of claim 4, wherein the molecular weight of polyethylene glycol is at least 400 but less than 1400.

6. The capacitor of claim 4, wherein the molecular weight of polyethylene glycol is at least 600 and at most 1200.

7. The capacitor of claim 4, wherein the molecular weight of polyglycerol is at least 300 but less than 4000.

8. The capacitor of claim 4, wherein the molecular weight of polyglycerol is at least 800 and at most 3000.

9. The capacitor of claim 1, wherein the dielectric layer contains fluorine.

10. A method for manufacturing a solid electrolytic capacitor, comprising:
    forming an anode from any one of a valve metal and an alloy mainly made of a valve metal;
    forming a dielectric layer by anodizing the anode;
    forming a first conducting polymer layer on a surface of the dielectric layer by applying a solution containing a monomer and a non-ionic surfactant to the surface and by then polymerizing the monomer, the first conducting polymer layer containing the non-ionic surfactant;
    forming a second conducting polymer layer that lacks the non-ionic surfactant on the first conducting polymer layer by polymerizing a monomer for forming the second conducting polymer layer; and
    forming a cathode layer on the second conducting polymer layer.

11. The method of claim 10, wherein a chemical polymerization method is used for forming the first conducting polymer layer.

12. The method of claim 10, wherein an electrolytic polymerization method is used for forming the second conducting polymer layer.

13. The method of claim 10, wherein the anodization is carried out in an electrolyte solution containing fluorine ions.

14. The method of claim 13, wherein the electrolyte solution contains at least one kind selected from the group consisting of ammonium fluoride, potassium fluoride, sodium fluoride, and hydrofluoric acid.

15. The method of claim 10, wherein the first and second conducting polymer layers are each formed of at least one of poly(3,4-ethylenedioxythiophene) and polypyrrole.

16. The method of claim 10, wherein the non-ionic surfactant in the first conducting polymer layer is within 0.0005 weight % to 0.005 weight %.

17. The method of claim 10, wherein the non-ionic surfactant is at least one of polyethylene glycol and polyglycerol.

18. The method of claim 10, wherein the molecular weight of polyethylene glycol is at least 400 but less than 1400.

* * * * *